United States Patent [19]

Yokota

[11] Patent Number: 4,533,341

[45] Date of Patent: Aug. 6, 1985

[54] BELT TYPE POWER TRANSMITTING SYSTEM

[75] Inventor: Akira Yokota, Yokohama, Japan

[73] Assignee: Nissan Motor Company, Ltd., Yokohama, Japan

[21] Appl. No.: 368,677

[22] Filed: Apr. 14, 1982

[30] Foreign Application Priority Data

Apr. 20, 1981 [JP] Japan .................................. 56-58434

[51] Int. Cl.³ .............................................. F16H 7/12
[52] U.S. Cl. .................................... 474/109; 474/110; 474/136
[58] Field of Search ............... 474/101, 102, 103, 104, 474/109, 110, 136

[56] References Cited

U.S. PATENT DOCUMENTS

| | | | |
|---|---|---|---|
| 2,893,255 | 7/1959 | Bayliss | 474/111 |
| 2,911,838 | 11/1959 | McGarth | 474/28 X |
| 3,132,596 | 5/1964 | Dinger | 474/117 X |
| 3,463,022 | 10/1967 | Miller | 474/110 |
| 3,785,220 | 1/1974 | Jacobs | 474/110 |
| 3,995,399 | 12/1976 | Weiner et al. | 51/148 |
| 4,094,205 | 6/1978 | Cook | 74/731 |
| 4,249,425 | 2/1981 | Watson | 474/110 |
| 4,274,308 | 6/1981 | Iwanaga et al. | 74/869 |
| 4,276,038 | 6/1981 | Kraft | 474/110 |
| 4,277,240 | 7/1981 | Kraft | 474/110 |
| 4,283,181 | 8/1981 | Sproul | 474/110 |
| 4,283,182 | 8/1981 | Kraft | 474/110 |
| 4,299,583 | 11/1981 | Kraft et al. | 474/110 |
| 4,355,991 | 10/1982 | Kraft | 474/110 |

FOREIGN PATENT DOCUMENTS

| | | |
|---|---|---|
| 249385 | 7/1912 | Fed. Rep. of Germany . |
| 2144688 | 3/1973 | Fed. Rep. of Germany . |
| 995495 | 12/1951 | France .................. 474/110 |
| 2350518 | 2/1977 | France . |
| 279415 | 3/1952 | Switzerland . |

Primary Examiner—Lawrence Staab
Assistant Examiner—Dwight G. Diehl
Attorney, Agent, or Firm—Lane, Aitken and Kananen

[57] ABSTRACT

An endless belt passes around a first pulley directly driven by an automotive engine and a second pulley securely mounted on a driving member of an auxiliary device to rotate therewith. An idler pulley engages with the belt to provide the same with tension. An actuator shifts the idler pulley to vary the amount of the belt tension in accordance with an operation load applied to the auxiliary device.

8 Claims, 5 Drawing Figures

BELT TYPE POWER TRANSMITTING SYSTEM

BACKGROUND OF THE INVENTION

1. Field of the Invention

The present invention relates in general to a belt-type power transmitting system which transmits power by using an endless belt, and more particularly to a belt-type power transmitting system which transmits the power of an automotive internal combustion engine to a power consuming auxiliary device of the engine.

2. Description of the Prior Art

In general, power consuming auxiliary devices, such as an alternator, a compressor of an air conditioner, a pump of a power steering device, or the like, are driven by an output shaft of the engine through a belt-type power transmitting system. In order to effectively transmit the power of the engine to such auxiliary devices, it is important to minimize the slippage of the belt relative to the associated driving and driven pulleys about which the belt passes. Hitherto, for achieving minimization of the belt slippage, an idler pulley is employed which is arranged to contact the belt to provide the same with a constant predetermined amount of tension. Usually, in order to assure the transmission of power from the engine to the auxiliary device even when the auxiliary device is providing a heavy load, the idler pulley is set to be constantly strongly pressed against the belt to provide the high tension needed for heavy loads. However, this means that high tension is constantly applied to the belt, even when the auxiliary device is producing a relatively light load condition requiring only a light belt tension for minimizing the belt slippage. Accordingly, this arrangement is inadvisable since this constant high tension shortens the life of the belt.

BRIEF SUMMARY OF THE INVENTION

It is therefore an essential object of the present invention to provide an improved belt-type power transmitting system which is free of the above-mentioned drawback.

According to the present invention, there is provided a belt-type power transmitting system for transmitting power from an automotive engine to at least one power consuming auxiliary device. The system comprises an endless belt passing about both a first pulley directly driven by the engine and a second pulley securely mounted on a driving member of the auxiliary device to rotate therewith, an idler pulley engaging with the belt to provide the same with a tension, and means for changing the position of the idler pulley relative to the belt to vary the degree of tension of the belt in accordance with an operation load applied to the auxiliary device.

BRIEF DESCRIPTION OF THE DRAWINGS

Other objects and advantages of the present invention will become clear from the following description when taken in conjunction with the accompanying drawings, in which.

DETAILED DESCRIPTION OF THE INVENTION

Figure 1:
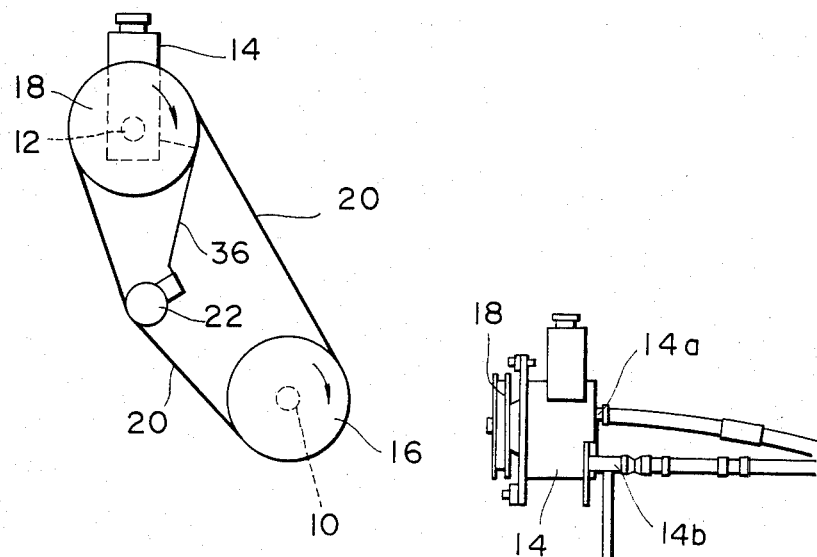
FIG. 1 shows a belt-type power transmitting system of a first embodiment, according to the present invention.

Referring to FIG. 1, there is shown a belt-type power transmitting system of a first embodiment, which is constructed to transmit the driving power of the engine to a power steering device. Designated by numerals 10 and 12 are respectively an output shaft of an internal combustion engine (not shown) and a driving shaft of a power steering pump 14.

The belt-type power transmitting system comprises a driving pulley 16 securely mounted on the engine output shaft 10 to rotate therewith, and a driven pulley 18 securely mounted on the driving shaft 12 of the power steering pump 14 to rotate therewith. An endless belt 20 passes around the driving and driven pulleys 16 and 18 for achieving synchronous rotation of these pulleys. An idler pulley 22 of a next-described automatic belt tension adjustor contacts rotatably the inside face of the belt 20 to provide the same with a tension.

Figure 2:
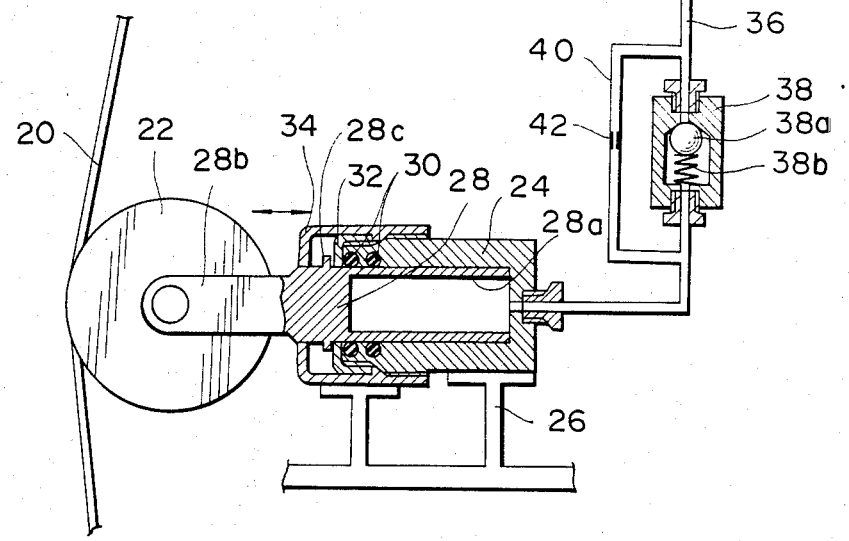
FIG. 2 shows an automatic belt tension adjustor which is employed in the system of the invention.

As is clearly shown by FIG. 2, the automatic belt tension adjustor including the idler pulley 22 comprises a cylinder 24 which is connected to a vehicle body (not shown) through a supporter 26. A piston 28 having a blind bore 28a is sealingly slidably received in the cylinder 24 in such a manner that the blind bore 28a merges with the bore of the cylinder 24. For assuring sealing between the piston 28 and the cylinder 24, suitable sealing members 30 are arranged in the illustrated manner. A retainer 32 is attached to the cylinder 24 to hold the sealing members 30 in position. A cap 34 is fixed to the cylinder 24 to cover the retainer 32, providing a suitable distance between it and the retainer 32. The piston 28 has a coaxially extending rod portion 28b which is projected outwardly from the cylinder 24 through the retainer 32 and the cap 34. The idler pulley 22 is rotatably supported on the leading end of the rod portion 28b. The piston 28 has at a portion between the retainer 32 and the cap 34 a flange 28c integral therewith. The flange 28c is engageable with the retainer 32 and the cap 34, so that the axial movement of the piston 28 and thus that of the rod portion 28b are restricted. A tube 36 connects the interior of the cylinder 24 to an outlet port 14b of the power steering pump 14 for introducing a pressurized oil into the cylinder 24. Designated by numeral 14a is an inlet port 14a of the pump 14 from which decompressed oil is introduced into the pump 14. A check valve 38 is disposed in the tube 36, which comprises a ball 38a and a spring 38b. The spring 38b biases the ball 38a in a direction to close the tube 36 leading to the outlet port 14b of the pump 14. A bypass tube 40 bypasses the check valve 38 and has an orifice 42 disposed therein.

When, in operation, the pressure in the outlet port 14b of the pump 14 exceeds the predetermined level thereby opening the check valve 38, there occurs a smooth oil flow in the tube 36 from the outlet port 14b to the interior of the cylinder 24. Thus, under this condition, with increase in pressure at the outlet port 14b, the piston 28 and thus the idler pulley 22 are moved leftward in FIG.

2 thereby increasing tension applied to the belt 20. By changing the character of the spring 38b of the check valve 38, the oil pressure at which the leftward movement of the idler pulley 22 in FIG. 2 starts can be adjusted.

Figure 3:
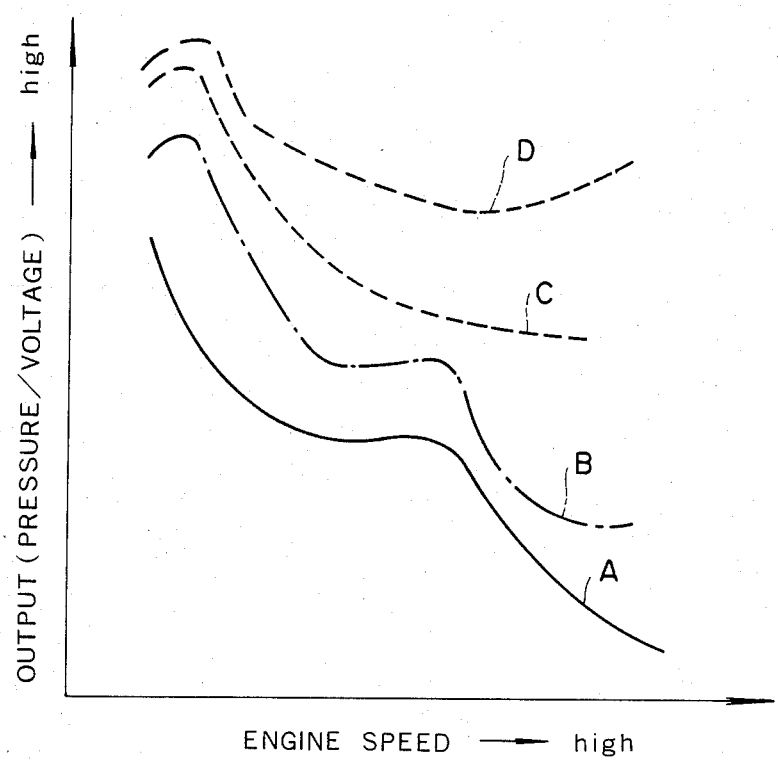
FIG. 3 is a graph showing the respective characteristics of outputs produced by various auxiliary devices of an internal combustion engine.

Depending on the engine speed, the oil pressure in the outlet port 14b of the pump 14 varies in a manner as is indicated by a curved line A of FIG. 3. Since the variation of the pressure in the outlet port 14b is generally corresponding to that of the load applied to the power steering device, the tension applied to the belt 20 increases with increase of the load of the power steering device. Thus, when the load of the power steering device is high, corresponding high tension is applied to the belt 20 by the idler pulley 22 preventing belt slippage on the driving and driven pulleys 16 and 18. On the other hand, when the load of the power steering device is low, only a light tension is applied to the belt 20 sufficient to provide efficient power transmission by preventing slippage of the belt 20. Thus, the effective power transmitting is provided while assuring prolongation of the life of the belt 20.

Figure 4:
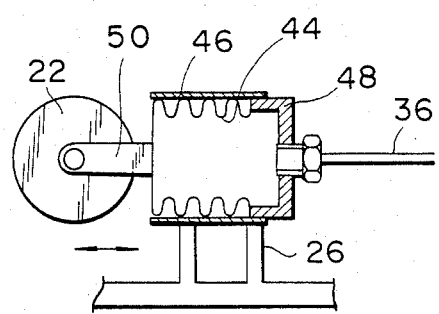
FIG. 4 shows an essential portion of a modification of the automatic belt tension adjustor.

In FIG. 4, there is partially shown a modification of the automatic belt tension adjustor. The modified adjustor herein shown comprises a bellows 44 housed in a casing 46 which is mounted to a vehicle body (not shown) through a supporter 26. An open end of the bellows 44 is closed by a base member 48 secured to the casing 46. A rod member 50 rotatably supporting thereon the idler pulley 22 is fixed to the axially movable end portion of the bellows 44. The interior of the bellows 44 is communicated with the outlet port 14b of the power steering pump 14 through the tube 36, as shown in FIG. 2.

In the embodiment described hereinabove, the oil pressure in the outlet port 14b of the power steering pump 14 is used as information indicating the degree of the tension which the belt 20 requires for achieving the optimal power transmission. In the invention, however, other information is usable instead of the oil pressure of the power steering pump 14. The characteristics of other types of information are shown by curved lines B, C and D in FIG. 3. The line B shows the output (voltage) of a regulator of an alternator driven by the engine, the line C shows the pressure of a cooling medium supplied to a compressor of an air conditioner, such as "Freon" gas (a trademark of E. I. du Pont de Nemours and Co.) efficient power transmission by preventing slippage and the line D shows the negative pressure supplied to a vacuum-suspended power brake. As is seen from these lines B, C and D, the information represented by these lines exhibits characteristics similar to the information represented by line A. Thus, such information can be used as a substitute for the oil pressure in the outlet port 14b of the power steering pump 14.

Figure 5:
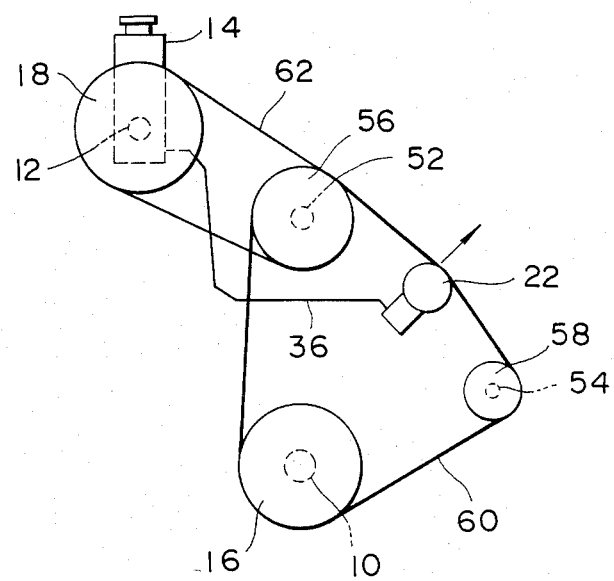
FIG. 5 shows a belt-type power transmitting system of a second embodiment according to the present invention.

Referring to FIG. 5, there is shown a belt-type power transmitting system of a second embodiment of the present invention, which is contructed to transmit the driving power of the engine to the power steering device, an engine cooling fan and an alternator. Designated by numerals 52 and 54 are respectively a driving shaft of the engine cooling fan and a driving shaft of the alternator. The parts shown in FIG. 1 are designated by the same numerals here.

The system of this second embodiment comprises a pulley 56 securely mounted on the driving shaft 52 of the engine cooling fan, and a pulley 58 securely mounted on the driving shaft 54 of the alternator. Two endless belts 60 and 62 are employed. One belt 60 passes around the driving pulley 16 of the engine, the pulley 58 of the alternator and the pulley 56 of the cooling fan. The other belt 62 passes around the pulley 56 of the cooling fan and the pulley 18 of the power steering pump 14. The idler pulley 22 having the construction mentioned hereinabove contacts the inside face of the belt 60 to provide the same with a tension.

The second embodiment is based on a fact that the loads of the engine cooling fan and the alternator exhibit characteristics similar to that of the load produced by the power steering pump 14.

As is described hereinabove, according to the present invention, the belt tension is suitably controlled depending on the load produced by the auxiliary device driven by the engine. Thus, effective power transmission is achieved and prolongation of the life of the belt is assured.

What is claimed is:

1. In a motor vehicle having a power steering pump driven by an engine of the vehicle and producing a hydraulic pressure indicative of a load on said pump, a power transmitting system for transmitting the power of the engine to said power steering pump, comprising:
   an endless belt passing over both a first pulley directly driven by said engine and a second pulley securely mounted on a driving member of the power steering pump to rotate therewith;
   an idler pulley rotatably engaging said belt to provide the same with tension; and
   a hydraulic pressure-actuated device having mounted thereon said idler pulley, said device varying the position of the idler pulley relative to said belt continuously throughout a range in accordance with the load on said pump so that greater tension is provided between said idler pulley and said belt for greater loads on said pump and vice versa, said range having a predetermined minimum tension, said hydraulic pressure-actuated device being constantly and fluidly in communication with said pump irrespective of the magnitude of the pressure produced by said pump, wherein said hydraulic pressure actuated device comprises:
   a movable member which is movable depending on the hydraulic pressure of hydraulic fluid supplied thereto, said movable member supporting thereon said idler pulley; and
   a conduit fluidly connecting said hydraulic pressure actuated device with said pump for permitting fluid in said pump to flow toward said hydraulic pressure-actuated device when a predetermined minimum pressure corresponding to said predetermined minimum tension is exceeded and wherein said conduit comprises:
   a check valve disposed in said conduit for closing said conduit when the pressure produced by said auxiliary device is lower than a predetermined value;
   a bypass conduit bypassing said check valve; and
   an orifice disposed in said bypass conduit for restricting the hydraulic fluid flow through said bypass conduit.

2. A power transmitting system as claimed in claim 1, in which said conduit leads to an outlet port of said pump.

3. A power transmitting system as claimed in claim 2, in which said hydraulic pressure-actuated device comprises:

a cylinder stationarily mounted to a vehicle body, the interior of said cylinder being connected to said conduit; and a piston sealingly and slidably received in said cylinder, said piston having an extension on which said idler pulley is rotatably supported.

4. A power transmitting system as claimed in claim 2, in which said hydraulic pressure-actuated device comprises:

bellows supported on a vehicle body, the interior of said bellows being connected to said conduit; and a rod member fixed to said bellows and rotatably supporting thereon said idler pulley.

5. A power transmitting system in a vehicle of the type which includes an engine; a power consuming auxiliary device which produces a range of fluid pressure directly relating to the load on said auxiliary device; an endless belt passing around a first pulley directly driven by the engine and a second pulley securely mounted on a driving member of said auxiliary device; and tension-varying means for varying the tension applied to the endless belt by the idler pulley in response to the load of the auxiliary device, said tension-varying means including:

pressure-sensing means for sensing a pressure in said range of fluid pressure associated with said auxiliary device which is representative of the load of the auxiliary device;

position-changing means responsive to said pressure-sensing means for changing the position of said idler pulley relative to said endless belt to vary the degree of tension in said belt so that when the load on said auxiliary device is higher, the tension on the belt is higher, and when the load on said auxiliary device is lower, the tension on the belt is correspondingly lower, while maintaining sufficient tension at low loads to prevent slippage of said endless belt about said pulley, said position-changing means having a fluid pressure actuated device for receiving a pressure from said pressure-sensing means representative of the load on said auxiliary device and responsively changing the position of the idler pulley relative to said belt in accordance with said pressure, said fluid pressure-actuated device being constantly in fluid communication with said auxiliary device irrespective of the magnitude of the pressure produced by said auxiliary device, said fluid pressure actuated device including a movable member connected to said idler pulley to change its position relative to said belt, said position-changing means also including means for providing at least a predetermined pressure to said idler pulley to maintain sufficient tension to prevent slippage at low loads on said auxiliary device, wherein said auxiliary device is a power steering pump producing hydraulic fluid pressure within said pressure range; and said pressure-sensing means includes a fluid conduit connecting said pump to said fluid pressure-actuated device; and said tension maintaining means includes: a check valve disposed in said conduit for closing said conduit when the fluid pressure produced by said pump is lower than a predetermined value; a bypass conduit bypassing said check valve; and an orifice disposed in said bypass conduit.

6. The system as set forth in claim 5 wherein said fluid pressure actuated device comprises:

a cylinder stationarily mounted to a vehicle body, the interior of said cylinder being connected to said conduit; and a piston sealingly and slidably received in said cylinder, said piston having an extension on which said idler pulley is rotatably supported.

7. The system as set forth in claim 5 wherein said fluid pressure actuated device comprises:

bellows supported on a vehicle body, the interior of said bellows being connected to said conduit; and a rod member fixed to said bellows and rotatably supporting thereon said idler pulley.

8. In a motor vehicle having a power steering pump driven by an engine of the vehicle and producing a hydraulic pressure that varies as a function of the load on said pump, a power transmitting system for transmitting power of the engine to said power steering pump, comprising:

an endless belt passing over both a first pulley directly driven by said engine and a second pulley securedly mounted on a driving member of said power steering pump to rotate therewith;

an idler pulley rotatably engaging said belt to provide on said belt;

a hydraulic pressure actuated device mounted on said idler pulley for varying the position of the idler pulley relative to the other pulleys in accordance with the hydraulic pressure produced by said pump so that greater tension is applied to the belt by said idler pulley for greater loads on said pump and vice versa;

a movable member on said hydraulic pressure actuated device, said member having movement which is a function of the hydraulic pressure of fluid supplied thereto and supports thereon said idler pulley and a fluid conduit which connects said hydraulic pressure actuated device with said pump so that the hydraulic pressure produced by said pump can be applied to said hydraulic pressure actuated device;

a check valve disposed in said conduit for closing said conduit when the pressure produced by said pump is lower than a predetermined value;

a bypass conduit bypassing said check valve; and an orifice disposed in said bypass conduit for restricting the hydraulic fluid flow through said bypass conduit.

* * * * *